United States Patent [19]

Roucek

[11] 4,320,382
[45] Mar. 16, 1982

[54] AUTOMOTIVE ALARM

[75] Inventor: Dennis G. Roucek, Atlanta, Ga.

[73] Assignee: Roman Industries, Inc., Atlanta, Ga.

[21] Appl. No.: 175,351

[22] Filed: Aug. 4, 1980

[51] Int. Cl.³ .................. B60R 25/04; B60R 25/10
[52] U.S. Cl. .................................. 340/64; 180/287; 307/10 AT; 340/63
[58] Field of Search .................... 340/53, 63, 64; 307/10 AT; 180/287

[56] References Cited

U.S. PATENT DOCUMENTS

| 3,824,403 | 7/1974 | McGuirk, Jr. | 340/63 X |
| 3,858,175 | 12/1974 | Kopera, Jr. | 340/63 |
| 3,879,705 | 4/1975 | Binder et al. | 340/53 |
| 3,967,166 | 6/1976 | Wei | 307/10 AT X |
| 4,074,672 | 2/1978 | LaDue et al. | 307/10 AT X |
| 4,107,962 | 8/1978 | MacKinnon | 307/10 AT X |
| 4,150,731 | 4/1979 | Tannenbaum | 180/287 X |
| 4,187,496 | 2/1980 | Kovens et al. | 340/63 |
| 4,240,071 | 12/1980 | Ochiai | 340/64 X |

*Primary Examiner*—John W. Caldwell, Sr.
*Assistant Examiner*—Joseph E. Nowicki
*Attorney, Agent, or Firm*—Jones, Thomas & Askew

[57] ABSTRACT

An automobile alarm comprising a pair of self latching relay devices one or the other of which, but not both, must operate within a predetermined time after turning the ignition switch on or hot wiring around the switch. The depression of the horn ring within the predetermined time disables the alarm and connects the normal circuits of the car for normal operation. The failure to depress the horn ring within the predetermined time latches the horn or an auxiliary alarm device on and prevents starting of the car. A timing device for unlatching the horn after a predetermined alarm time is also shown.

4 Claims, 1 Drawing Figure

AUTOMOTIVE ALARM

TECHNICAL FIELD

The present invention relates to theft alarms for automobiles and more particularly to an automobile theft alarm which is responsive to theft of the car with or without the ignition key.

BACKGROUND OF THE INVENTION

The proliferation of the automobile in the twentieth century has had the unfortunate but predictable collateral effect of a proliferation of automobile thefts. The automobile being mobile by nature tends to be very susceptible to thieves.

The problem of automobile thefts has led to the development of a number of automobile alarm systems which are designed to detect the presence of a thief and to trigger audible or visible alarms and to otherwise prevent operation of the automobile by the thief. Since automobiles conventionally include a horn it has been found to be advantageous to use the horn already in the automobile as an audible alarm device.

Desirable features of an automobile alarm include a simple arming of the alarm which will not be so physically difficult or complicated as to discourage owners from using the alarm, the ability of the alarm to detect theft of the automobile with or without the ignition key; dependability of the alarm so as to not be spuriously triggered by the owner; and the absence of constraints on other normal operations associated with the car such as unloading of rear areas or the trunk.

While the prior art and contemporary alarm systems have met some of the foregoing desirable features, prior to the present invention no automobile alarm system included all of the aforementioned desirable elements in a simple and dependable alarm device.

Other alarm systems have included electrical contacts within the tumblers of the ignition lock which arm the alarm a predetermined time after removal of the ignition key. Such an alarm system has the drawback that if the thief has obtained the ignition key, either by directy stealing the key or by finding it in the ignition switch of an unattended automobile, the alarm will be insensitive to the subsequent taking of the car.

Various other systems have included time delays which will arm alarms a predetermined amount of time after operation of an arming switch. Such alarms usually include various sensors for sensing undue motion of the automobile body or attempts to operate the hood latch. Others use time delay devices which provide an entrant to the car with a predetermined time after opening of the door to disarm the alarm either via a switch or by insertion of the ignition key into the ignition lock. Generally the drawbacks of such a system include the requirement that a concealed switch of some form be provided which must be operated in a separate arming step each time the automobile is left unattended. Since logic dictates that location of the switch not be apparent to the thief, implementation of such a system requires that the switch be a concealed. Such switches are usually in a difficult to reach location either in the interior of the automobile or under the hood.

Still other alarm systems have included automatically arming alarms which become armed a predetermined time after the ignition switch is turned off. While such systems overcome the undesirable feature of requiring a separate arming step, they tend to inhibit the owner from enjoying other benefits of the automobile. Particularly, devices which have motion sensors greatly inhibit the ability of the owner to load or unload any freight or other objects which may be carried in the back or the trunk of the automobile. It is necessary in using such a device to either have a separate disarming switch concealed somewhere within the interior, or for the owner to exit the car, open the trunk, and rush to start the engine again before the alarm becomes triggered.

Still another system has used the conventional automobile cigarette lighter as the timing element for arming the automobile alarm which the owner is preparing to exit. Such a system requires a separate arming step that overcomes the undesirable feature of having an arming device in a concealed and difficult to reach location. However, the use of such an alarm device is subject to the well known variations in thermal time constants and other elements which control the time it takes a cigarette lighter to "pop out" once it is inserted for heating. Yet another problem with such an arming device is the potential failure of the cigarette lighter to become sufficiently heated so as to pop out and arm the alarm. The potential for certain lighters to pop completely out and start a fire in the interior must also be considered.

Still other alarms have been proposed which are sensitive to electrical transients in the ignition system which tend to indicate an attempt to start the automobile by means of electrical jumpers around the ignition switch, commonly referred to as "hot wiring".

While all of the above described systems have their useful features, none of the systems provide all of the above mentioned desirable features.

SUMMARY OF THE INVENTION

The present invention overcomes the limitations of prior art and other alarm systems by providing an alarm which is automatically armed whenever the automobile ignition is turned off and which requires a simple sequence of operations to override the alarm. The sequence of steps necessary to override the alarm is chosen such that the automobile thief would not attempt a sequence since such an attempt in a car not fitted with the alarm would sound the horn and draw attention to the thief.

The present invention provides a novel alarm which requires operation of a particular switch within a predetermined time after the ignition of the automobile is turned on or else the alarm will be activated latching on the horn or some other alarm device. The alarm is equally sensitive to an ignition on condition provided by operation of the ignition switch with the proper key or to a hot wiring operation.

In the preferred form a simple modification of the horn circuit is provided wherein defeat of the alarm requires the operation of a conventional horn ring switch within a predetermined time after the ignition has been turned on. Naturally enough, automobile thieves will be loathe to operate the horn switch having turned on the ignition in the automobile due to the common experience that the horn would blow under such conditions drawing attention to the activities of the thief.

The present invention may be integrated into existing automobiles very simply.

A preferred form of the present invention also includes a timing device which will terminate the alarm signal a predetermined time after it is initiated.

Therefore it is an object of the present invention to provide an automobile alarm which is immediately armed upon the turning off of the ignition switch. It is also an object of the present invention to provide an automobile alarm which may be easily integrated with existing parts of the automobile and which makes use of existing parts, particularly the horn ring switch and the automobile horn.

It is still a further object of the present invention to provide an alarm in which a simple sequence of operations which are readily accessible to the operator of the automobile is necessary to override the alarm and to use a sequence that will normally not be attempted by a thief.

It is still a further object of the present invention to provide an automobile alarm which is equally sensitive to attempts to steal the car using the ignition key or by hot wiring around the ignition switch.

These and other objects of the present invention will become apparent from the detailed description below.

BRIEF DESCRIPTION OF THE DRAWINGS

The FIGURE is a schematic diagram of the preferred embodiment of the present invention.

DETAILED DESCRIPTION

Figure 1:
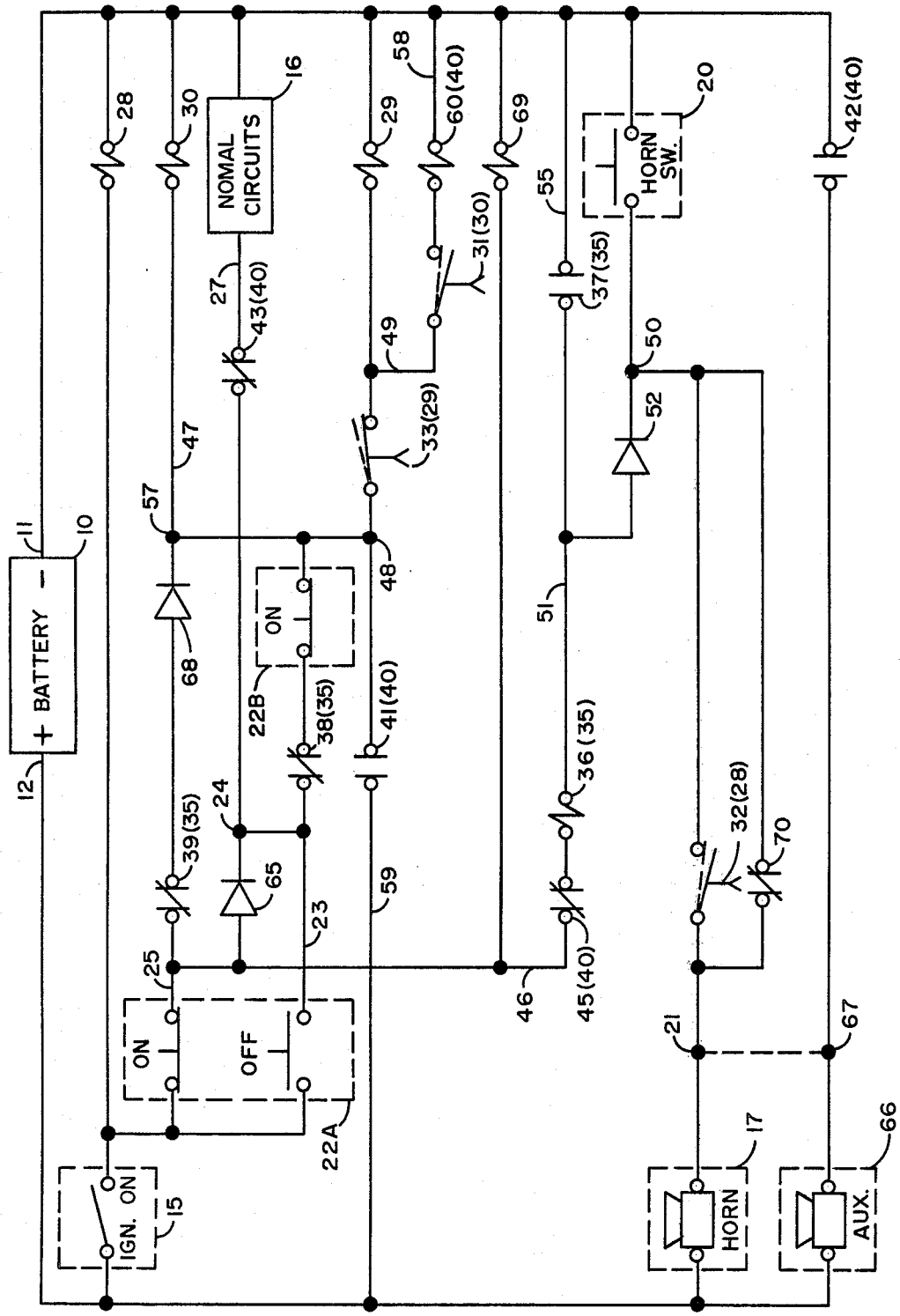

The construction and operation of the preferred embodiments of the present invention will be appreciated from the following detailed description with reference to the FIGURE.

A conventional battery 10 of the automobile is used to supply current to circuits of the automobile and the alarm. Battery 10 is shown in a conventional negative ground system having a negative terminal 11 grounded in the automobile and a positive terminal 12 leading to ignition switch 15. It will be understood that the on position (closed) of ignition switch 15 also includes the start position of conventional ignition switches.

A plurality of normal circuits 16 are the circuits normally supplied with current from battery 10 through ignition switch 15. Normal circuits 16 will include the branch (not shown) containing the ignition coil necessary for operation of the automobile. An embodiment of the present invention may also be constructed in which only the ignition coil is represented by box 16 and the remaining circuits are undisturbed.

The environment of the preferred embodiment also includes a conventional horn 17 and a momentary horn ring switch 20 which is normally one or more sets of contacts wired in parallel spaced around the conventional horn ring on the automobile steering wheel. It is to be understood that horn 17 as shown in FIG. 1 may include a conventional horn relay but for simplicity it will be appreciated that the grounding of point 21 will activate horn 17 whether a separate conventional horn relay is included or not.

The preferred embodiment of the present invention also includes an alarm switch having two poles, 22a and 22b, which may be used to remove the alarm from the circuitry of the automobile. However, since under normal conditions of operating the automobile the alarm will be left on, such a switch may be a key operated switch located in a generally inconvenient area. This is due to the fact that the only times in which the user would be motivated to turn the alarm off would be under conditions such as servicing the automobile. For example adjustment of exhaust and intake valves requires rotation of the crank shaft by small increments and this is often accomplished by providing a jumper momentarily to the starting motor of the car.

It may be seen that with alarm switch 22a and 22b in its on position, as shown in the drawing, line 25 is in series with ignition switch 15. When alarm switch 22 is in its off position, ignition switch 15 is in series with line 23 through point 24 which leads to line 27 thus connecting normal circuits 16 in their conventional fashion. Diode 65 prevents current from flowing from point 24 to line 25 thus removing electrical contact between battery 10 and line 25 which disarms the alarm.

The simplicity of integrating the first preferred embodiment with the existing automobile may be appreciated from inspection of the FIGURE. It may therein be seen that the normal ignition circuit must be interrupted to insert alarm switch 22 and the normal horn circuit between horn 17 and horn ring switch 20 must be interrupted to insert horn connecting relay 28. These are the only modifications necessary in order to fit an automobile with an alarm according to the present invention.

An auxiliary alarm device, shown as 66, may be used together with horn 17. If only the use of device 66 is desired the jumper shown between points 21 and 67 should be cut. It will be appreciated that auxiliary device 66 may be a bell, siren or any suitable device for providing a loud audio output.

The preferred embodiment makes use of three predetermined time periods which are supplied by time delay relays 28, 29, and 30. The function of these relays in the overall combination will be explained in detail hereinbelow.

The preferred embodiment further uses a pair of conventional relays 35 and 40. For simplicity in this specification the relays have been named according to their function and thus relay 35 will be referred to as the defeat relay since it is operated when the alarm is successfully defeated, and relay 40 will be referred to as the alarm relay since it operates and latches when the circuitry detects a failure on the part of the operator to execute the proper sequence of steps necessary to defeat the alarm.

Relay 35 includes a coil 36, normally open contact 37 and a pair of normally closed contacts 38 and 39. It should be appreciated that in the drawing all relay contacts are shown in their normal conditions, that is, the condition with the coil of the associated relay unenergized. Relay 69 is included to allow normal operation of horn 17 when the ignition is turned off.

In the preferred embodiment of the present invention the necessary sequence to defeat the alarm simply comprises operation of horn switch 20 within a predetermined time after ignition switch 15 provides an ignition on condition. It will also be appreciated that an ignition on condition may be provided by a thief hot wiring the car, that is, providing a jumper around ignition switch 15. Operation of the alarm may be appreciated from the following description of operation by an authorized owner knowing the presence of the alarm, and the operation of an unauthorized user such as a thief.

Defeat of the Alarm

In the preferred embodiment the predetermined period for operation of horn ring switch 20 has been selected as two seconds and it is a period controlled by time delay relay 30. Defeat of the alarm is accomplished by operating horn ring switch 20 within the predetermined time period prior to closure of the contacts of relay 30, in the case of the preferred embodiment, two seconds.

When the ignition switch is first turned to its on position, line 25 is connected to positive lead 12 of battery 10. Line 25 is connected through normally closed contact 39 of relay 35 and diode 68 to points 47 and 48. The connection to point 47 provides a voltage across the coil of time delay relay 30 and thus, if this voltage is not removed from point 47 before the operating time of the delay device within time delay relay 30, relay 30 will close its contacts.

Under the conditions described line 25 is also connected through line 46 and normally closed contacts 45 of alarm relay 40 to one side of coil 36 of defeat relay 35. Assume for the moment the operator of the vehicle is aware of the presence of the alarm and its proper operation. The operator would then close horn ring switch 20 prior to closure of the contacts of time delay relay 30. Closure of horn ring switch 20 grounds point 50 which is connected through diode 52 to line 51 and the other side of coil 36 of defeat relay 35. It will therefore be appreciated that a complete path between positive lead 12 of battery 10 and ground is provided through coil 36.

The provision of a current path through coil 36 causes relay 35 to operate closing contacts 37 and opening contact 38 and 39. The closure of contact 37 latches the grounded side of relay coil 36 to ground through line 55 thus latching relay 35 in its operating state until ignition switch 15 is again turned off.

The opening of normally closed contacts 38 and 39 of relay 35 breaks the connection between line 25 and point 47 thus terminating the voltage present at the coil of time delay relay 30. The opening of contacts 38 and 39 of defeat relay 35 removes the entire branch of the alarm supplied by line 57 from the circuit of battery 10 thus preventing operation of alarm relay 40. It will therefore be appreciated that the alarm has now been defeated and the car may be operated in a normal fashion.

Time delay relay 28, which is selected to have an activation time of ten seconds in the preferred embodiment, closes its contacts ten seconds after ignition switch 15 is operated. The closure of the contacts of relay 28 establishes a current path between point 21 and point 50 thus allowing for normal operation of horn 17 by horn ring switch 20. It will therefore be appreciated that once the alarm is defeated the horn may be operated in its normal fashion after the time delay provided by time delay 28. It will further be appreciated from the foregoing that horn ring switch 20 comprises a selectively operable switch means for providing a switch signal, the switch signal being the grounding of point 50.

Activation of Alarm

The operation of the alarm when the vehicle is being manipulated by an unauthorized user or a thief will now be described. In an attempt to start the car assume that the thief either closes ignition switch 15 by use of a key which has been obtained in an unauthorized manner, or provides a jumper around switch 15 so that line 25 has become electrically connected to line 12. It will be appreciated therefore that establishment of a current path between line 12 and line 25 constitutes an ignition on condition without regard to whether it is established through ignition switch 15 or through a hot wired jumper.

It will readily be appreciated that a person stealing the automobile will not be motivated to activate horn ring switch 20 for fear of sounding horn 17 and drawing attention to the act of thievery. Therefore, once the ignition on condition has been established connecting line 12 to line 25, assume that the thief does not operate horn ring switch 20. In this case line 25 will remain connected through normally closed contacts 39 and diode 68 to line 57 and thus to points 47 and 48.

Two seconds after the ignition on condition is established time delay relay 30 will operate its contacts. The closure of the contacts of relay 30 connects point 48 through line 49 to one side of coil 60 of alarm relay 40. The other side of coil 60 is grounded through line 58 and thus coil 60 will be activated operating alarm relay 40.

The operation of alarm relay 40 has the following consequences. Normally closed contacts 45 open thus terminating the possibility of any complete current path through coil 36 of defeat relay 35. Normally closed contact 43 also opens. This assures that the normal circuits 16 of the automobile cannot be operated and thus the ignition coil will be unable to supply the necessary voltage to the spark plugs of the automobile.

Operation of relay 40 also closes normally open contacts 41 and 42. The closure of contacts 41 connects positive lead 12 through line 59 to point 48 thus providing a continuous current path to coil 60 and thus latching alarm relay 40 in its active state. The closure of contacts 42 grounds points 21 and 67 thus sounding horn 17 and auxiliary alarm device 66 continuously. Of course auxiliary device 66 may be removed only horn 17 will sound in response to the grounding of point 21.

Therefore upon the operation of alarm relay 40, the relay becomes latched on, a path cannot be completed to the normal circuit 16 of the car from the positive lead 12 of battery 10, and the horn and/or auxiliary alarm device will continuously sound. These conditions are designed to discourage the thief or unauthorized user from continuing to attempt to operate the automobile.

From the foregoing it will be understood that the connection of line 49 to one side of coil 60 through the contacts of relay 30 may be considered an alarm input. It will also be appreciated that horn 17 and auxiliary alarm device 66 each comprise an alarm device for providing an audible alarm output. Furthermore it will be understood that relay 40 comprises a first control means for activating the alarm device in response to the alarm input established by closure of the contacts of relay 30.

It will also be appreciated that defeat relay 35 comprises a second control means which is responsive to the grounding of point 50 to prevent the aforementioned alarm input from being provided when point 50 is grounded within a predetermined time after the establishment of the ignition on condition connecting line 25 to line 12. It will further be appreciated that this control means alternately provides the alarm input through the closure of contacts 30 in response to the absence of an occurrence of the grounding of point 50 within the predetermined time after initialization of the ignition on condition.

In the preferred embodiment a third time delay relay 29 having normally closed contacts is provided. In the preferred embodiment the operation time of the relay is selected as thirty seconds but any desirable time may be used. Once the alarm has been latched through the closure of contacts 41 the alarm will remain latched until the current path to coil 60 is broken. This is the function of time delay relay 29. Time delay relay 29 starts its timing upon the establishment of the ignition on condition since point 48 becomes electrically connected to line 12 when the ignition on condition is established. Therefore thirty seconds after the ignition switch is operated (or the car is hot wired) time delay relay 29 will open its contacts thus breaking the current path to coil 60 of alarm relay 40. This will cause alarm relay 40 to reset and will thus reset the entire alarm. It is of course possible to replace time delay relay 29 by a selectively operable switch for turning off the alarm. However it is preferred to have a second predetermined time for the sounding of the alarm.

Also consider the case if a thief hot wires line 12 to line 27, such as a direct jumper to the positive side of the ignition coil. When this occurs, a current path is provided through contact 43, point 24, contacts 38 and 22b to point 47. This path allows the alarm to be activated and latch as described above. Also note that diodes 65 and 68 prevent current from reaching line 46 thus making it impossible to defeat the alarm with the hot wire is connected in this manner. It will thus be appreciated that diodes 65 and 68 further comprise the control means mentioned hereinbefore for preventing defeat of the alarm when a jumper is provided from positive lead 12 to a predetermined point in the normal circuits of the automobile.

The inventor of the present invention presently contemplates that the best mode of making and practicing the present invenion is in an embodiment using solid state timing components and integrated circuit logic. It is believed that such an embodiment will be cheaper to manufacture than the disclosed preferred embodiment and that design of such an embodiment based on the present disclosure will be apparent to one of ordinary skill in the art.

However, the inventor is familiar with the use of time delay relay logic as disclosed herein and lacks sufficient experience with the integrated circuits mentioned above. Therefore, the disclosed preferred embodiment is shown as conceived and designed by the inventor and constitutes the best mode of the present invention which he is able to construct even though he believes others will be able to implement what he believes may be a better mode.

It will further be appreciated that the embodiment of the alarm of the present invention provide all of the desirable features of an automobile alarm referenced above and that the alarm is relatively inexpensive and simple.

It will be appreciated from the foregoing that other embodiments of the present invention may be constructed in addition to the embodiment described herein and therefore the scope of the present invention is to be limited only by the claims below.

I claim:

1. In an automobile including a selectively operable horn ring switch, an ignition switch for providing an ignition on condition and an alarm device for providing an audible alarm output, an alarm wherein the improvement comprises in combination:

means connecting said alarm to said selectively operable horn ring switch for providing a switch signal;
   a first control means for actuating and latching on said alarm device in response to an alarm input;
   a second control means responsive to said selectively operable horn ring switch for preventing said alarm input in response to provision of said switch signal within a predetermined time after initiation of said ignition on condition and alternately for providing said alarm input in response to an absence of an occurrence of said switch signal within said predetermined time after said initiation of said ignition on condition.

2. In an automobile including a selectively operable horn ring switch, an ignition switch for providing an ignition-on condition, and an alarm device for providing an audible alarm output, an alarm wherein the improvement comprises in combination:

means connecting said alarm to said selectively operable horn ring switch for providing a switch signal;
   a first control means for actuating said alarm device in response to an alarm input;
   a second control means responsive to said selectively operable horn ring switch for preventing said alarm input in response to provision of said switch signal within a first predetermined time after initiation of said ignition-on condition and alternately for providing said alarm input in response to an absence of an occurrence of said switch signal within said first predetermined time after said initiation of said ignition-on condition; and
   means for disconnecting said alarm device from said horn ring switch in response to termination of said ignition-on condition and for connecting said alarm device to said horn ring switch a second predetermined time after said initiation of said ignition-on condition.

3. In an automobile including a selectively operable horn ring switch, an ignition switch for providing an ignition-on condition, and an alarm device for providing an audible alarm output, an alarm wherein the improvement comprises in combination:

means connecting said alarm to said selectively operable horn ring switch for providing a switch signal;
   a first control means for actuating said alarm device in response to an alarm input;
   a second control means responsive to said selectively operable horn ring switch for preventing said alarm input in response to provision of said switch signal within a first predetermined time after initiation of said ignition-on condition and alternately for providing said alarm input in response to an absence of an occurrence of said switch signal within said first predetermined time after said initiation of said ignition-on condition; and
   third control means for connecting said alarm device to said horn ring switch during the absence of said ignition-on condition, for disconnecting said alarm device from said horn ring switch in response to said initiation of said ignition-on condition, and for reconnecting said alarm device to said horn ring switch a second predetermined time after said initiation of said ignition-on condition.

4. The improvement as recited in claims 2 or 3 wherein said alarm device comprises an automobile horn.

* * * * *